(12) United States Patent
Tada et al.

(10) Patent No.: US 10,730,582 B2
(45) Date of Patent: Aug. 4, 2020

(54) BRAKE PEDAL DEVICE AND SADDLE-RIDE TYPE VEHICLE

(71) Applicant: HONDA MOTOR CO., LTD., Minato-ku, Tokyo (JP)

(72) Inventors: Masashi Tada, Wako (JP); Kyohei Kawai, Wako (JP); Kohta Murakami, Wako (JP); Mikio Uchiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/223,245

(22) Filed: Dec. 18, 2018

(65) Prior Publication Data

US 2019/0202524 A1 Jul. 4, 2019

(30) Foreign Application Priority Data

Dec. 28, 2017 (JP) .................................. 2017-254685

(51) Int. Cl.
| | |
|---|---|
| *B62L 3/04* | (2006.01) |
| *B62K 23/08* | (2006.01) |
| *G05G 1/48* | (2008.04) |
| *B60T 7/04* | (2006.01) |
| *G05G 1/44* | (2008.04) |

(52) U.S. Cl.
CPC ............... *B62L 3/04* (2013.01); *B60T 7/04* (2013.01); *B62K 23/08* (2013.01); *G05G 1/48* (2013.01); *G05G 1/44* (2013.01)

(58) Field of Classification Search
CPC .. B62L 3/04; B60T 7/04; B62K 23/08; G05G 1/48; G05G 1/44
See application file for complete search history.

(56) References Cited

U.S. PATENT DOCUMENTS

| | | | | |
|---|---|---|---|---|
| D499,056 | S | * 11/2004 | James | ........................ D12/179 |
| 2018/0346055 | A1 | * 12/2018 | Jaselskis | .................. B62L 3/04 |

FOREIGN PATENT DOCUMENTS

| | | | | |
|---|---|---|---|---|
| DE | 19800146 | | 4/1999 | |
| DE | 10301184 A1 | * | 8/2004 | ............... B62L 3/04 |
| EP | 3409572 | | 12/2018 | |
| GB | 201708801 | * | 7/2017 | ............... B62L 3/04 |
| JP | 60-161688 | | 10/1985 | |
| JP | 63-117694 | | 7/1988 | |
| JP | 2018122743 A | * | 8/2018 | ............... B62L 3/04 |

OTHER PUBLICATIONS

Extended European Search Report for European Patent Application No. 18213809.9 dated Jun. 7, 2019.
Japanese Office Action for Japanese Patent Application No. 2017-254685 dated Oct. 1, 2019.

* cited by examiner

*Primary Examiner* — Vicky A Johnson
(74) *Attorney, Agent, or Firm* — Amin, Turocy & Watson, LLP

(57) ABSTRACT

This brake pedal device includes an arm portion (21) pivotally supported on a vehicle body to be rotatable, and a pedal portion (22) provided at a distal end portion (21*b*) of the arm portion (21). The pedal portion (22) includes a first operation portion (31) configured to operate a brake (102), a first uneven portion (33) formed on at least a part of the first operation portion (31), a second operation portion (32) provided at a position different from the first operation portion (31), and a second uneven portion (34) formed on at least a part of the second operation portion (32).

15 Claims, 6 Drawing Sheets

BRAKE PEDAL DEVICE AND SADDLE-RIDE TYPE VEHICLE

CROSS-REFERENCE TO RELATED APPLICATION

The present application claims priority based on Japanese Patent Application No. 2017-254685 filed on Dec. 28, 2017, the contents of which are incorporated herein by reference.

BACKGROUND OF THE INVENTION

Field of the Invention

The present invention relates to a brake pedal device and a saddle-ride type vehicle.

Description of Related Art

In a saddle-ride type vehicle such as a motorcycle, a brake pedal for imparting a braking force to a rear wheel is provided on a side surface of the vehicle, and is operated by stepping downward from above with the foot of the occupant.

Japanese Unexamined Utility Model Publication No. S63-117694 discloses a configuration in which a pedal having unevennesses on an upper surface is provided at a distal end portion of a brake pedal having a proximal end portion attached to a vehicle body in a rotatable manner. According to such a configuration, when the occupant depresses and releases the pedal, the unevenness prevents slipping and slippage of the shoes is curbed, such that the operation can be reliably performed.

SUMMARY OF THE INVENTION

Incidentally, when traveling on a rough road, when performing cornering or the like, the occupant pushes each part of the lower limb into the vehicle to enhance the stability of the vehicle or to enhance the stability of the occupant's body. For example, a step attached to the vehicle body may be strongly stepped on from the upper side, or the inside of the ankle, knee, or thigh may be pressed against a frame, a tank, a seat or the like of the vehicle body. Especially, in a saddle-ride type vehicle for competitions such as motocross, the vehicle body may behave violently depending on the state of the road surface. Therefore, in order to ensure stability for the vehicle and the occupants, it is desired to further enhance the operability of the vehicle.

An object of an aspect of the present invention is to provide a brake pedal device capable of enhancing operability of a vehicle and a saddle-ride type vehicle including the brake pedal device.

In order to achieve the above object, a brake pedal device according to an aspect of the present invention employs the following configurations.

(1) A first aspect of the present invention relates to a brake pedal device including: an arm portion pivotally supported on a vehicle body to be rotatable; and a pedal portion provided at a distal end portion of the arm portion, wherein the pedal portion includes a first operation portion configured to operate a brake, a first uneven portion formed on at least a part of the first operation portion, a second operation portion provided at a position different from the first operation portion, and a second uneven portion formed on at least a part of the second operation portion.

(2) In the aspect of (1), the first operation portion may be provided on a first surface of the pedal portion, and the second operation portion may be provided on a second surface facing a direction different from the first surface of the pedal portion.

(3) In the aspect of (2), the first operation portion may be provided to face upward and the second operation portion may be provided to face downward in a state of being mounted on a vehicle.

(4) In the aspect of any one of (1) to (3), the pedal portion may be provided to protrude in a second direction intersecting a first direction facing a vehicle front-rear direction of the arm portion, and an inclined portion inclined to gradually approach the first operation portion side as separating from the arm portion side along the second direction may be formed on the second operation portion on a side from which the pedal portion protrudes.

(5) In the aspect of (4), the second uneven portion may be formed on the arm portion side in the second direction with respect to the inclined portion.

(6) In the aspect of (4), a range in the second direction in which the second uneven portion is formed may be smaller than a range in the second direction in which the first uneven portion is formed.

(7) In the aspect of (4), an unevenness interval of the second uneven portion in the second direction may be smaller than an unevenness interval of the first uneven portion in the second direction.

(8) In the aspect of (1), an unevenness height dimension of the second uneven portion may be smaller than an unevenness height dimension of the first uneven portion.

(9) In the aspect of (1), the pedal portion may integrally have a first wall portion located on the distal end portion side in a first direction facing a vehicle front-rear direction of the arm portion, a second wall portion provided on a proximal end portion side at an interval in the first direction with respect to the first wall portion, and a connecting portion which connects the first wall portion and the second wall portion on a side away from the arm portion, wherein the first uneven portion may be formed on first end surfaces of the first wall portion, the second wall portion and the connecting portion, and the second uneven portion may be formed on second end surfaces of the first wall portion and the second wall portion.

(10) In the aspect of (9), the first wall portion may be inclined to approach the second wall portion side as being separated from the arm portion.

(11) In the aspect of (9), the first uneven portion may have first slit grooves and second slit grooves formed on each of the first wall portion and the second wall portion and extending in the first direction, and the second uneven portion may have third slit grooves and fourth slit grooves formed on each of the first wall portion and the second wall portion and extending in the first direction.

(12) In the aspect of (11), the first slit grooves formed in the first wall portion and the second slit grooves formed in the second wall portion may be formed at positions communicating with each other, the third slit grooves formed in the first wall portion and the fourth slit grooves formed in the second wall portion may be formed at positions communicating with each other.

(13) A second aspect of the present invention includes the first aspect of (1).

According to the above aspect (1), by providing the second operation portion at a position different from the first operation portion, the occupant can perform an input for performing an operation other than the operation for operating the brake with respect to the pedal portion. Further, by providing the second uneven portion in the second operation portion, it is possible to curb occurrence of slippage when the occupant operates the second operation portion. In this way, by reliably performing operations other than the operation of the brake with respect to the brake pedal, the operability of the vehicle can be enhanced.

According to the above aspect (2), since the second operation portion is directed in a direction different from that of the first operation portion, the direction of operation of the first operation portion is different from the direction of operation of the second operation portion. Thus, it is possible to curb confusion between the operation of the first operation portion and the operation of the second operation portion, thereby improving operability.

According to the above aspect (3), since the first operation portion faces upward, the operation for operating the brake can be performed by pushing the first operation portion downwards from above. In contrast, since the second operation portion faces downward, other operations can be performed by pushing the second operation portion upward from below. In this manner, the occupant can push the pedal portion such that it is caught from the lower side by pushing the second operation portion upward, and it is possible to enhance running stability.

According to the above aspect (4), by providing the inclined portion in the second operation portion, it is possible to prevent inadvertent catching of the foot on the second operation portion.

According to the above aspect (5), since the inclined portion is provided on the side away from the arm portion with respect to the second uneven portion, when the foot is moved from the first operation portion side to the second uneven portion side of the second operation portion, or when the foot is moved from the second uneven portion side of the second operation portion to the first operation portion side, it is possible to prevent inadvertent touching of the foot.

According to the above aspect (6), since the range in which the second uneven portion is formed is made to be smaller than the range in which the first uneven portion is formed, it is possible to prevent the foot from inadvertently touching the second operation portion.

According to the above aspect (7), by setting an unevenness interval of the second uneven portion to be smaller than the first uneven portion, even if the formation range of the second uneven portion is made small, since the number of unevennesses can be increased, the foot can be reliably caught by the second uneven portion. As a result, when intentionally operating the second operation portion, it is possible to suppress the slippage of the foot from the second operation portion and to reliably perform the operation.

According to the above aspect (8), since the unevenness height dimension of the second uneven portion is smaller than that of the first uneven portion, it is possible to prevent the foot from inadvertently touching the second operation portion.

According to the above aspect (9), since the first wall portion and the second wall portion are provided with an interval therebetween and there is no bottom portion, sand or mud can be prevented from accumulating on the pedal portion, and the operation of the pedal portion can be reliably performed. Further, when operating the first operation portion and the second operation portion, since the first uneven portion and the second uneven portion are formed on each of the first wall portion and the second wall portion, it is also possible for a slip prevention effect to be exhibited in the first direction.

According to the above aspect (10), since the first wall portion is inclined to approach the second wall portion side as being separated from the arm portion, it is possible to prevent an obstacle or the foot of the occupant from being caught from the side of the first wall portion during running.

According to the above aspect (11), since the first uneven portion and the second uneven portion have slit grooves extending in the first direction, it is possible to enhance the slip prevention effect in the second direction that intersects the first direction.

According to the above aspect (12), by causing the slit grooves to communicate with each other from the first wall portion and the second wall portion, when forming the slit grooves in the pedal portion by cutting or the like, it is possible to process the slit grooves of the first wall portion and the slit grooves of the second wall portion at the same time, and the processability can be enhanced.

According to the above aspect (13), since a saddle-ride type vehicle includes the aforementioned brake pedal, it possible to reliably perform operations other than operating the brake on the brake pedal device, thereby enhancing the operability of the vehicle.

DESCRIPTION OF EMBODIMENTS

Figure 1:
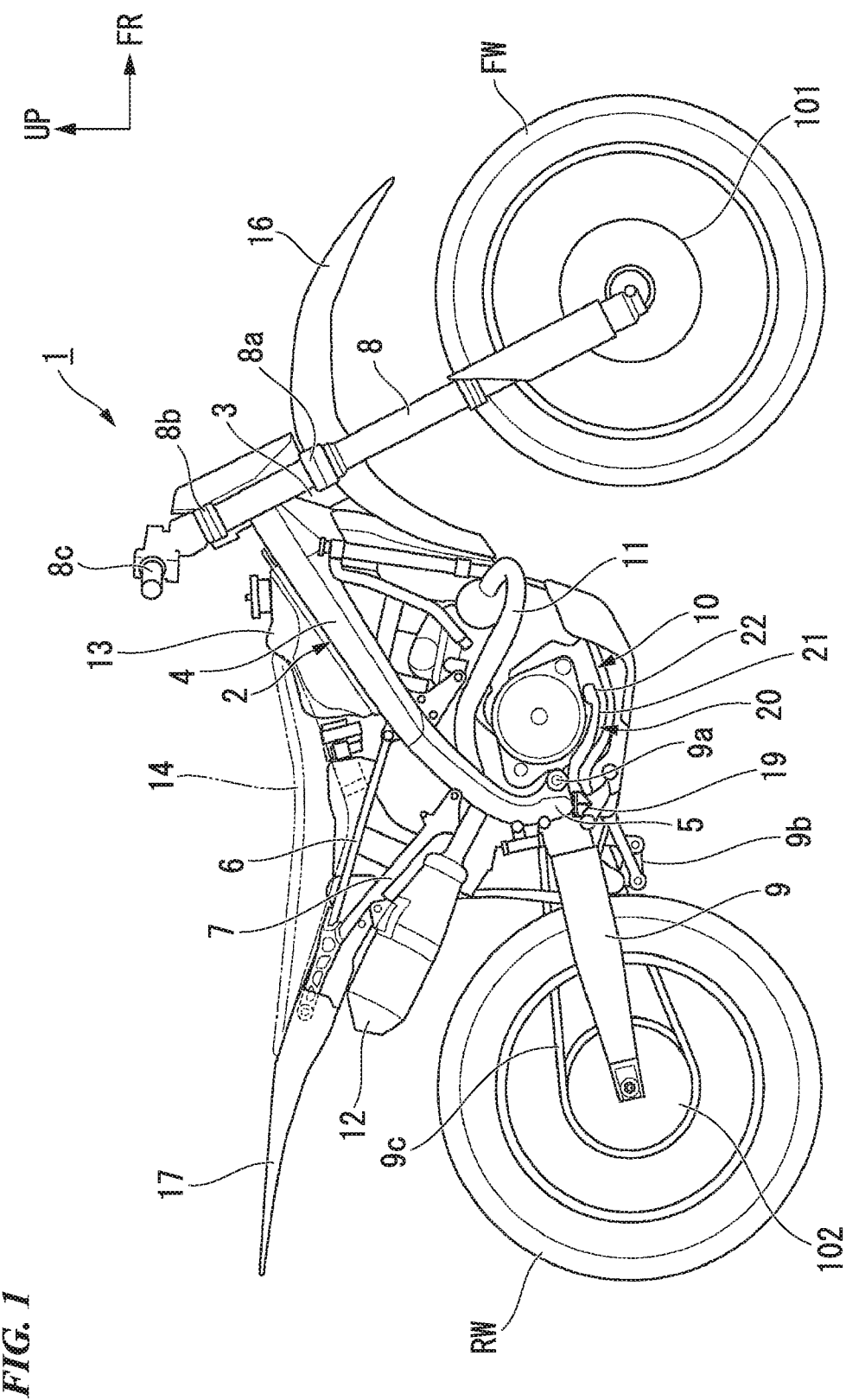
FIG. 1 is a right side view of a motorcycle according to an embodiment of the present invention.

Hereinafter, embodiments of the present invention will be described with reference to the drawings. In the following description, directions such as forward, backward, left and right are the same as those in the vehicle described below unless otherwise specified. In addition, in appropriate places in the drawings used for the following description, an arrow FR indicating the front of the vehicle, an arrow LH indicating the left side of the vehicle, an arrow UP indicating the upper side of the vehicle, and a line CL indicating the center between left and right sides of the vehicle body is shown.

As shown in FIG. 1, a body frame 2 of an off-road type motorcycle 1 (a saddle-ride type vehicle) is a twin spar type, and includes a pair of left and right main frames 4 extending rearward and downward from a head pipe 3, a pair of left and right pivot frames 5 connected to the rear lower sides of the left and right main frames 4, a pair of left and right seat frames 6 extending rearward and upward from rear end portions of the left and right main frames 4, and a pair of left and right support frames 7 extending rearward and upward from the left and right pivot frames 5 and connected to the rear end portions of the left and right seat frames 6. An engine 10 is mounted below the left and right main frames 4 and in front of the left and right pivot frames 5.

A pair of left and right front forks 8 is supported by the head pipe 3 so as to be steerable via a stem 8a in a front portion of the vehicle body. A front wheel FW is pivotally supported at lower end portions of the left and right front forks 8. A bar handle 8c is attached to a top bridge 8b at an upper end of the stem 8a.

At a rear portion of the vehicle body, a distal end portion of a swing arm 9 is vertically swingably supported by the left and right pivot frame 5 via a pivot shaft 9a. A rear wheel RW is pivotally supported at a rear end portion of the swing arm 9. A rear cushion mechanism 9b is interposed between the front portion of the swing arm 9 and the left and right pivot frames 5. The rear wheel RW and the engine 10 are connected to each other via a chain type power transmission mechanism 9c.

The front wheel FW is provided with a front brake 101, and an occupant operates a brake lever (not shown) provided on the bar handle 8c to apply a braking force to the front wheel FW. A rear brake (a brake) 102 is provided on the rear wheel RW, and the occupant operates a brake pedal (a brake pedal device) 20, which will be described later, to apply a braking force to the rear wheel RW.

A fuel tank 13 is disposed between the left and right main frames 4. An occupant seat 14 is disposed behind the fuel tank 13 and above the left and right seat frames 6. In the drawings, reference numeral 11 denotes an exhaust pipe of the engine 10, and reference numeral 12 denotes a muffler attached to a rear end of the exhaust pipe 11, respectively.

Regarding cover members made of synthetic resin, the motorcycle 1 is provided with a front fender 16 for covering the upper side of the front wheel FW, a rear fender 17 for covering the upper side of the rear wheel RW, a pair of left and right side covers (not shown) for covering a vehicle body side surface, a tank cover (not shown) for covering the periphery of the fuel tank 13, and the like.

Further, a step 19 on which the occupant places a foot is supported on the left and right pivot frames 5 via an appropriate bracket or the like.

Further, a pivot frame 5 on the right side of the vehicle body is provided with a brake pedal 20 for an occupant to operate the rear brake 102 with a foot.

As shown in FIGS. 2 to 5, the brake pedal 20 is provided with an arm portion 21 extending from the proximal end portion 21a toward the distal end portion 21b, and a pedal portion 22 provided at the distal end portion 21b of the arm portion 21.

Figure 2:
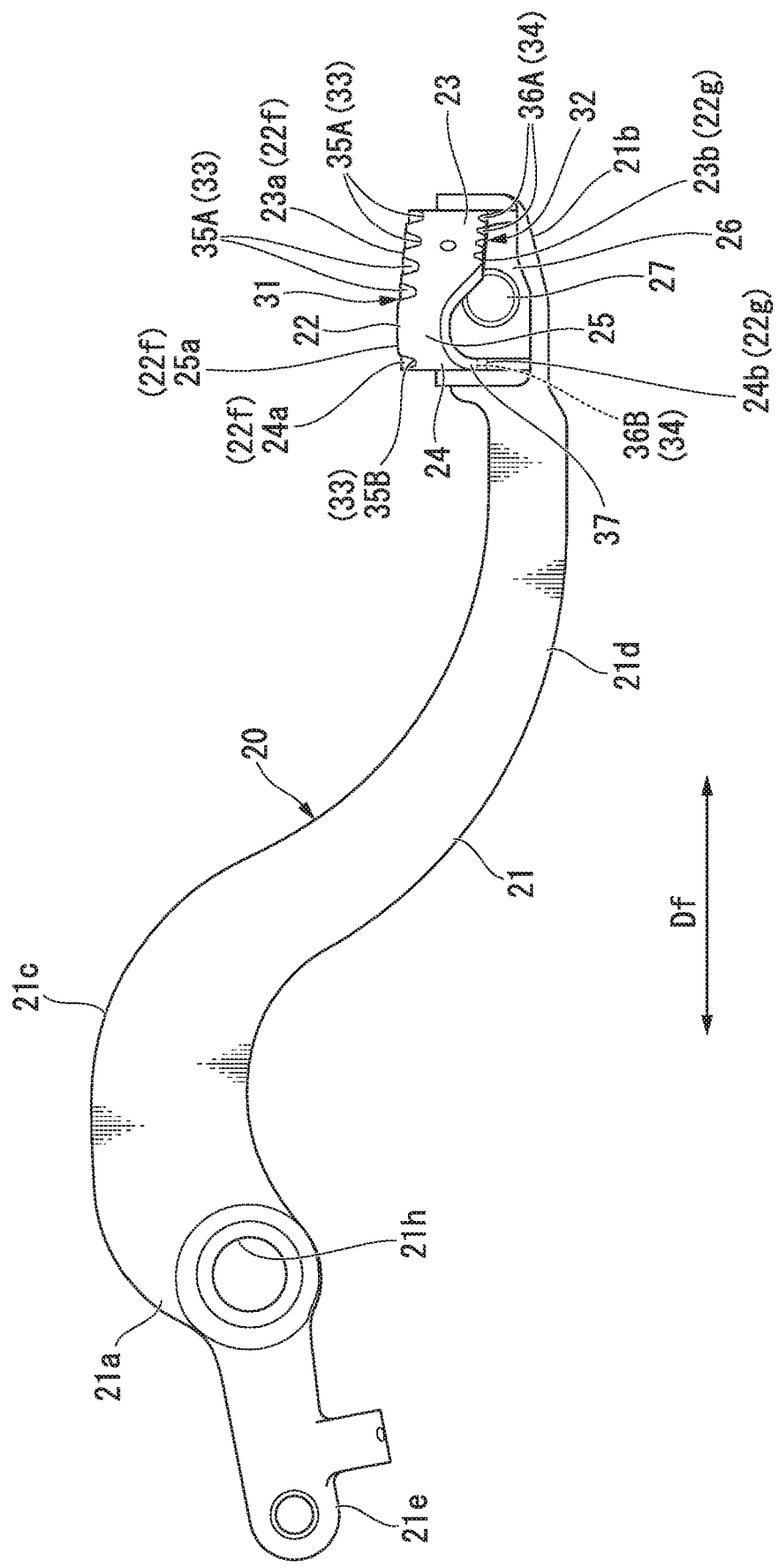
FIG. 2 is a side view of the brake pedal provided on the motorcycle as seen from a right side.
Figure 3:
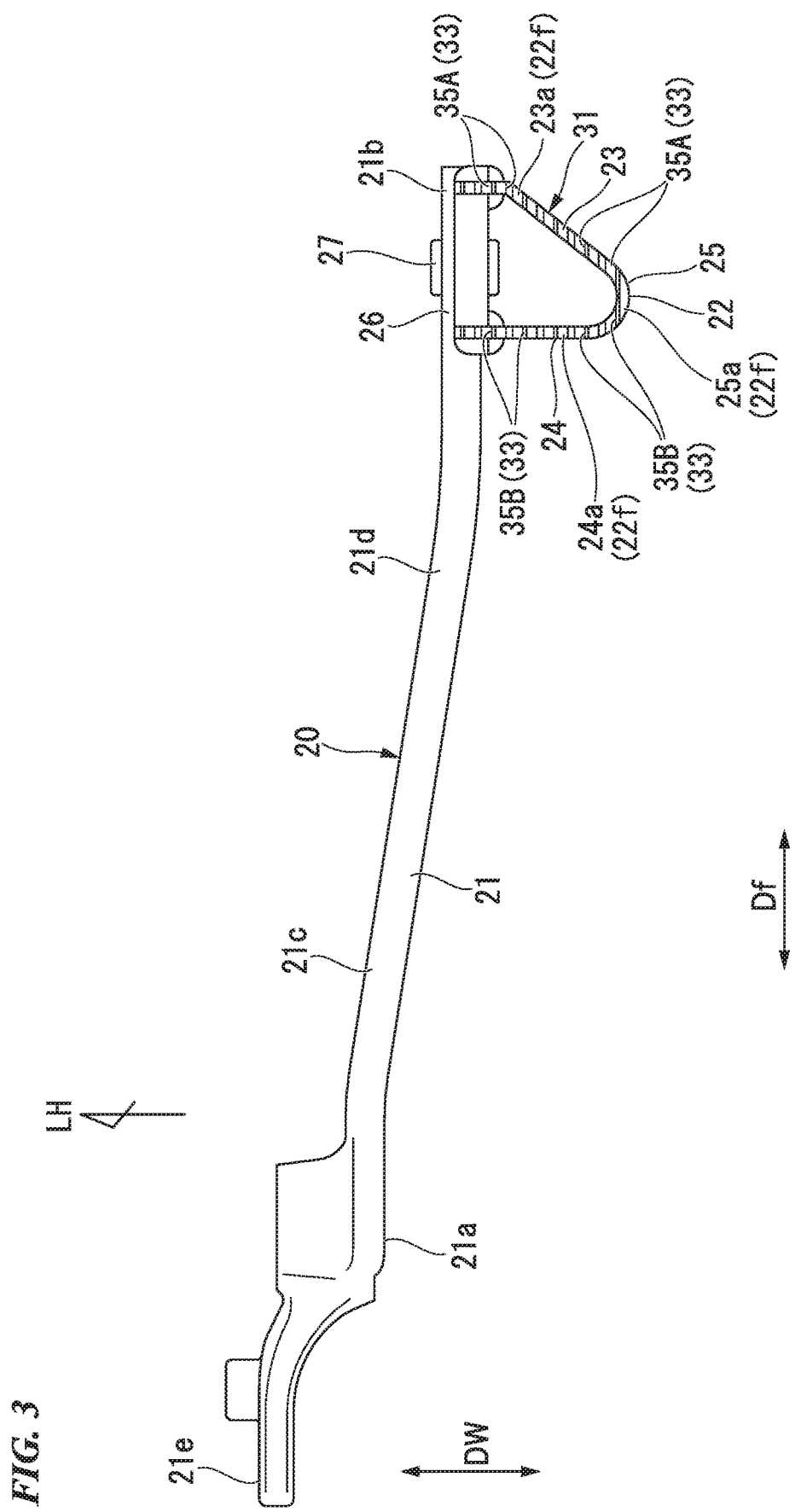
FIG. 3 is a plan view of the brake pedal.
Figure 4:
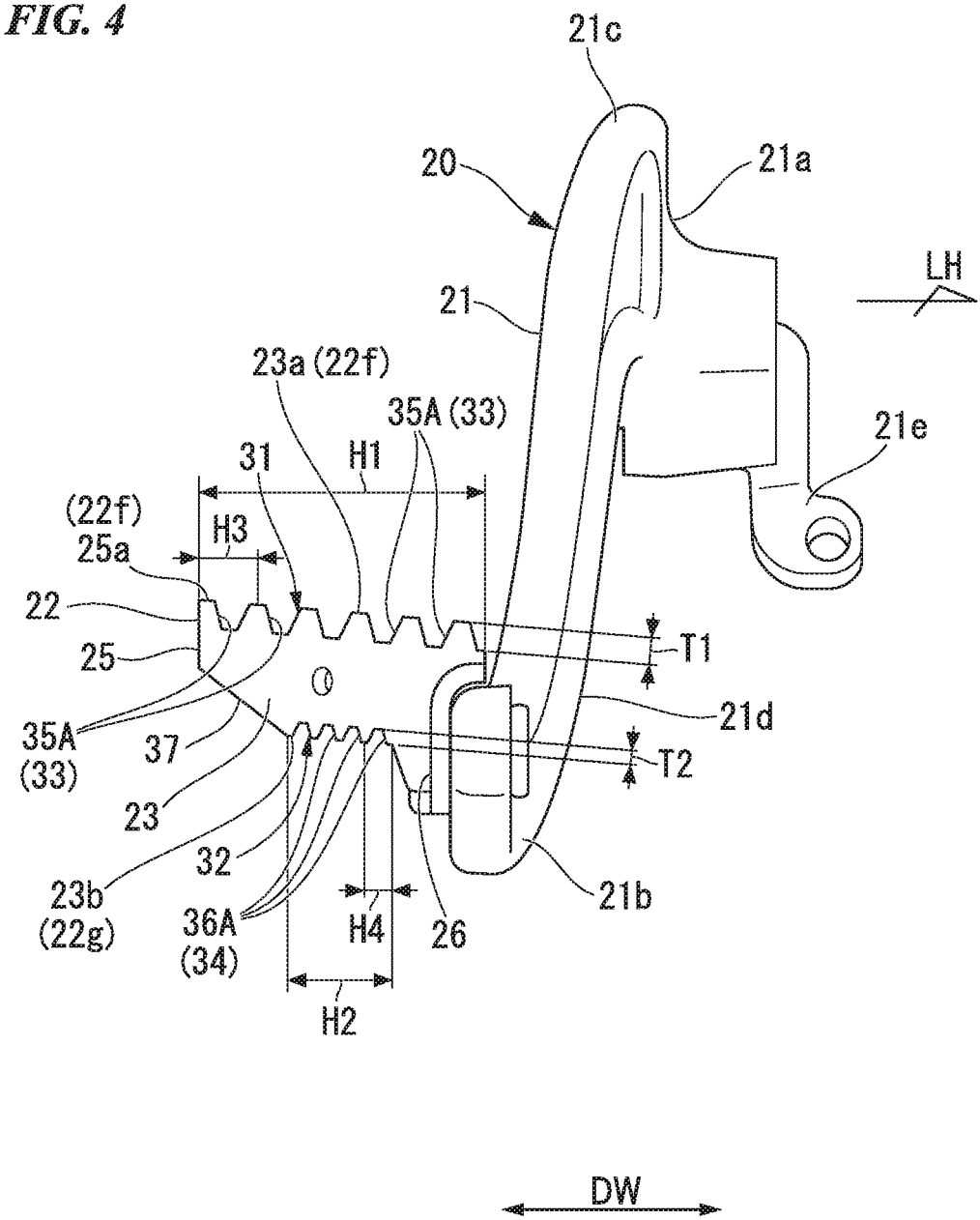
FIG. 4 is a front view of the brake pedal as seen from a front.

The arm portion 21 extends substantially along a front-rear direction Df (a first direction) of the motorcycle 1. As shown in FIGS. 2 to 4, the arm portion 21 integrally includes a curved portion 21c curving upward from the proximal end portion 21a toward the front part, an extending portion 21d which is continuous with the curved portion 21c and extends while curving obliquely downward toward the front, and a sub-arm portion 21e that extends rearward from the proximal end portion 21a.

A shaft support hole 21h through which a spindle (not shown) provided in the pivot frame 5 is inserted is formed on the proximal end portion 21a side of the arm portion 21. The spindle (not shown) is pivotally supported on the pivot frame 5 via a bearing (not shown) so as to be freely rotatable about its central axis. A spindle (not shown) is provided coaxially with the step 19 or in the vicinity of the step 19. A master cylinder or the like (not shown) for generating a hydraulic pressure for operating the rear brake 102 is connected to the sub-arm portion 21e. By operating the brake pedal 20, the rear brake 102 operates to brake the rear wheel RW when the spindle rotates together with the arm portion 21 around the central axis.

The pedal portion 22 is provided at the distal end portion 21b of the arm portion 21. Here, a direction that faces the vehicle front-rear direction that connects the proximal end portion 21a and the distal end portion 21b of the arm portion 21 is defined as the front-rear direction Df (the first direction), and a horizontal direction orthogonal to the front-rear direction Df is defined as a vehicle width direction Dw (a second direction). The pedal portion 22 is provided to protrude outward (rightward) in the vehicle width direction Dw (the second direction) with respect to the arm portion 21 extending in the front-rear direction Df.

As shown in FIGS. 2 to 6, the pedal portion 22 integrally has a front wall portion 23 (a first wall portion) located on the side of the distal end portion 21b in the front-rear direction Df, a rear wall portion 24 (a second wall portion) provided on the side of the proximal end portion 21a at an interval in the front-rear direction Df from the front wall portion 23, a connecting portion 25 which connects the front wall portion 23 and the rear wall portion 24 on the side spaced apart from the arm portion 21, and an inner wall portion 26 which connects the front wall portion 23 and the rear wall portion 24 on the side of the arm portion 21.

When the pedal portion 22 is seen in a plan view, the front wall portion 23 is inclined to approach the rear wall portion 24 side on the rear in the front-rear direction Df moving away from the arm portion 21 in the vehicle width direction Dw.

The connecting portion 25 is curved to bulge outward in the vehicle width direction Dw.

The inner wall portion 26 is connected to the arm portion 21 along the distal end portion 21b of the arm portion 21 by a fastening member 27 such as a rivet or a bolt or by welding.

Such a pedal portion 22 includes a brake operation portion 31 (a first operation portion) provided on the upper surface 22f (a first surface) thereof to face upward, and a lower operation portion 32 (a second operation portion) provided on the lower surface 22g (a second surface) to face downward.

Figure 6:
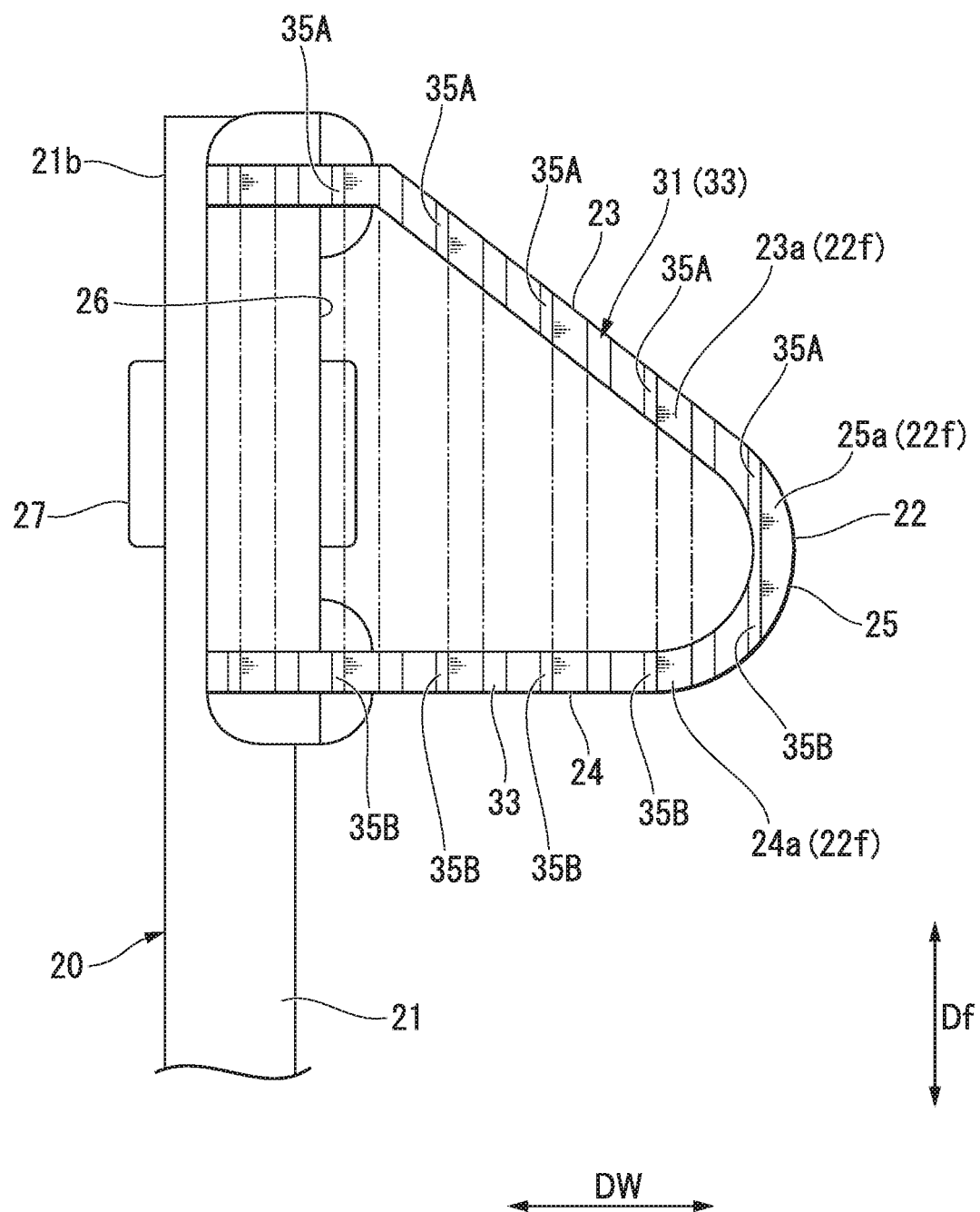
FIG. 6 is an enlarged plan view showing main parts of the brake pedal in an enlarged manner.

As shown in FIG. 6, in order for the rear brake 102 (see FIG. 1) to be operated, the brake operation portion 31 forms a tread surface on the pedal portion 22 for the occupant to step downwards on from above with a foot. An upper surface uneven portion 33 (a first uneven portion) is formed at least in a part of the brake operation portion 31. The upper surface uneven portion 33 is formed on the upper end surfaces 23a, 24a and 25a (end surfaces) of the front wall portion 23, the rear wall portion 24, and the connecting portion 25.

In the upper surface uneven portion 33, slit grooves 35A and 35B recessed downward are formed on an upper end surface 23a of the front wall portion 23 (including the front portion of the upper end surface 25a of the connecting portion 25) and an upper end surface 24a of the rear wall portion 24 (including the rear portion of the upper end surface 25a of the connecting portion 25). Each of the slit grooves 35A and 35B is formed on the upper end surfaces 23a, 24a and 25a of the front wall portion 23, the rear wall portion 24 and the connecting portion 25 and is formed to extend in the front-rear direction Df by cutting or the like. A plurality of slit grooves 35A and 35B are formed at intervals H3 in the vehicle width direction Dw. In the present embodiment, the slit grooves 35A and 35B are formed in a range H1 which extends substantially over the entire vehicle width direction Dw of the upper surface 22f of the pedal portion 22.

Here, the slit grooves 35A formed on the front wall portion 23 and the slit grooves 35B formed on the rear wall portion 24 are formed at positions communicating with each other along the front-rear direction Df. In other words, the slit grooves 35A formed on the front wall portion 23 and the slit grooves 35B formed on the rear wall portion 24 have the same position in the vehicle width direction Dw.

Figure 5:
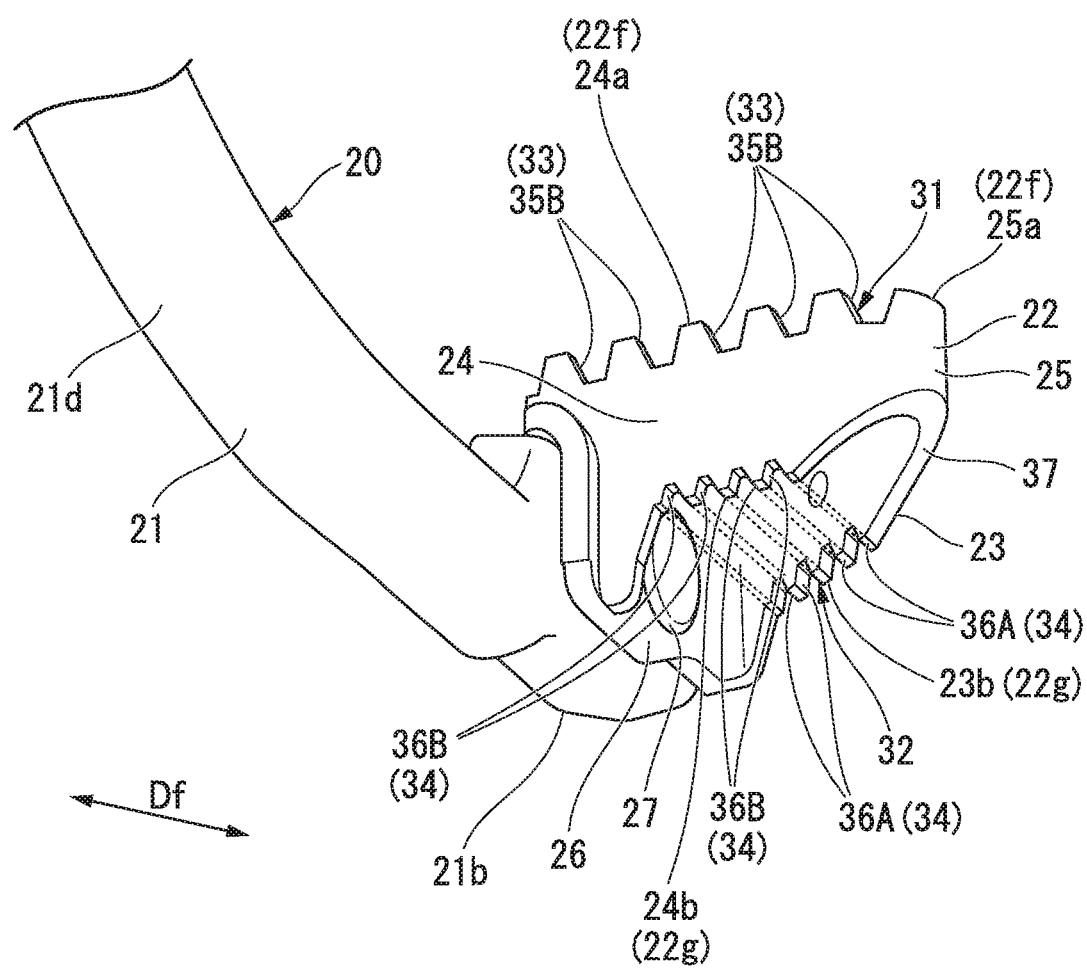
FIG. 5 is a perspective view of the brake pedal as seen obliquely from a rear.

As shown in FIGS. 2, 4, and 5, the lower surface operation portion 32 is formed at a position different from the brake operation portion 31 by being formed on the lower surface 22g of the pedal portion 22. In the present embodiment, the lower surface operation portion 32 forms an operation surface for performing an operation for enhancing the stability of the vehicle body or the occupant's body by the occupant pressing the pedal portion 22 with the foot from the lower side to the upper side. On the lower surface operation portion 32, a lower surface uneven portion 34 (a second uneven portion) is formed.

The lower surface uneven portion 34 is formed on the lower end surfaces 23b and 24b (end surfaces) of the front wall portion 23 and the rear wall portion 24. In the lower surface uneven portion 34, slit grooves 36A and 36B recessed upward are formed on the lower end surface 23b of the front wall portion 23 and the lower end surface 23b of the rear wall portion 24, respectively. Each of the slit grooves 36A and 36B is formed by cutting or the like so as to be formed on the lower end surfaces 23b and 24b of the front wall portion 23 and the rear wall portion 24 and to extend in the front-rear direction Df. A plurality of slit grooves 36A and 36B are formed at an interval H4 in the vehicle width direction Dw.

Here, the slit grooves 36A formed on the front wall portion 23 and the slit grooves 36B formed on the rear wall portion 24 are formed at positions communicating with each other in the front-rear direction Df. In other words, the positions of the slit grooves 36A formed on the front wall portion 23 and the slit grooves 36B formed on the rear wall portion 24 are the same in the vehicle width direction Dw.

In the present embodiment, the lower surface uneven portion 34 including the plurality of slit grooves 36A and 36B as described above is formed on a part of the lower surface 22g of the pedal portion 22 on the inner side in the vehicle width direction Dw (the side of the arm portion 21). Specifically, the lower surface uneven portion 34 is formed in a substantially horizontal portion formed on the inner side of the lower surface 22g of the pedal portion 22 in the vehicle width direction Dw. Thus, the range H2 in the vehicle width direction Dw in which the lower surface uneven portion 34 is formed is smaller than the range H1 in the vehicle width direction Dw in which the upper surface uneven portion 33 is formed.

The groove depth of the slit grooves 36A and 36B forming the lower surface uneven portion 34 is set to be smaller than the groove depth of the slit grooves 35A and 35B forming the upper surface uneven portion 33. As a result, an unevenness height (depth) dimension T2 of the lower surface uneven portion 34 is smaller than an unevenness height (depth) dimension T1 of the upper surface uneven portion 33.

Further, the interval H4 in the vehicle width direction Dw of the slit grooves 36A and 36B forming the lower surface uneven portion 34 is set to be smaller than the interval H3 in the vehicle width direction Dw of the slit grooves 35A and 35B forming the upper surface uneven portion 33. That is, the lower surface uneven portion 34 is smaller than the upper surface uneven portion 33 in the unevenness interval in the vehicle width direction Dw.

On the lower surface operation portion 32 of the lower surface 22g of the pedal portion 22, an inclined portion 37 is formed on the outer side in the vehicle width direction Dw (the side away from the arm portion 21, and the protruding distal end side of the pedal portion 22) with respect to the lower surface uneven portion 34. The inclined portion 37 is inclined diagonally upward to gradually approach the upper brake operation portion 31 side as separating from the arm portion 21 side along the vehicle width direction Dw.

The occupant steps on the upper surface 22f of the pedal portion 22 from the upper side to the lower side with a foot with respect to such a brake pedal 20, thereby performing an input for operating the rear brake 102 to the brake operation portion 31. At this time, the lower surface of the foot (boots and shoes) is caught by the upper surface uneven portion 33, thereby suppressing an occurrence of slippage.

In addition, the occupant pushes the lower surface 22g of the pedal portion 22 upward from below with the foot, thereby performing an operation of pressing the foot against the lower surface operation portion 32. As a result, the pedal portion 22 is caught from the lower side so as to be pressed down, thereby improving the stability of the vehicle body and the body. In addition, by pushing the lower surface operation portion 32 of the pedal portion 22 upward with the tiptoe of the foot, the occupant can relatively strengthen the force of stepping down on the step 19 on the heel side of the foot. This makes it possible to more reliably hold the vehicle body and the body, thereby improving the stability thereof, using the step 19 and the pedal portion 22 of the brake pedal 20 in combination.

As described above, the brake pedal 20 of the present embodiment includes an arm portion 21 pivotally supported on a vehicle body (the pivot frame 5) of the motorcycle 1 to be rotatable, and a pedal portion 22 provided at the distal end portion 21b of the arm portion 21. The pedal portion 22 includes a brake operation portion 31 for operating the rear brake 102, an upper surface uneven portion 33 formed on at least a part of the brake operation portion 31, a lower surface operation portion 32 provided at a position different from the brake operation portion 31, and a lower surface uneven portion 34 formed on at least a part of the lower surface operation portion 32.

According to this configuration, by providing the lower surface operation portion 32 at a position different from the brake operation portion 31, the occupant can perform an input for performing an operation other than the operation for operating the rear brake 102 with respect to the pedal portion 22. Further, by providing the lower surface uneven portion 34 in the lower surface operation portion 32, it is possible to suppress occurrence of slippage when the occupant operates the lower surface operation portion 32. In this way, by reliably performing operations other than the operation of the rear brake 102 with respect to the brake pedal 20, the operation of the motorcycle 1 can be enhanced, and the stability of the vehicle body and the occupant can be enhanced.

Further, such a brake pedal 20 can be mounted on the motorcycle 1 in place of the existing brake pedal device. Therefore, by merely replacing the existing brake pedal device with the brake pedal 20, the operability of the motorcycle 1 can be enhanced easily and at low cost, and the stability of the vehicle body or the occupant can be enhanced.

Further, in the brake pedal 20 of the present embodiment, the brake operation portion 31 is provided on the upper surface 22f of the pedal portion 22, and the lower surface operation portion 32 is provided on the lower surface 22g facing a direction different from the upper surface 22f of the pedal portion 22.

According to this configuration, the direction in which the brake operation portion 31 is operated is different from the direction in which the lower surface operation portion 32 is operated. Thus, it is possible to suppress confusion of the operation of the brake operation portion 31 and the operation of the lower surface operation portion 32, thereby improving operability.

In addition, the brake pedal 20 of the present embodiment is provided so that the brake operation portion 31 faces upward and the lower surface operation portion 32 faces downward in a state of being mounted on the motorcycle 1.

According to this configuration, since the brake operation portion 31 faces upward, the operation for operating the rear brake 102 can be performed by pushing the brake operation portion 31 from the upper side to the lower side. In contrast, since the lower surface operation portion 32 faces downward, an operation (another operation) for enhancing the stability of the vehicle body and the occupant can be performed by pushing the lower surface operation portion 32 from the lower side to the upper side. In this manner, the occupant can push the pedal portion 22 so as to be caught from the lower side by pushing the lower surface operation portion 32 upward, and it is possible to enhance running stability. Furthermore, when the vehicle behaves violently in accordance with the status of the road surface, for example in a case of jumping, it is possible to further enhance the posture stability and operability of the vehicle body and the occupant in the air.

Further, in the brake pedal 20 of the present embodiment, the pedal portion 22 is provided to protrude from the arm portion 21 in the vehicle width direction Dw that intersects the front-rear direction Df of the arm portion 21 facing in the front-rear direction of the vehicle, and an inclined portion 37, which is inclined to gradually approach the brake operation portion 31 side as separating from the arm portion 21 side along the vehicle width direction Dw, is formed in the lower surface operation portion 32 on the side in which the pedal portion 22 protrudes.

According to this configuration, by providing the inclined portion 37 on the lower surface operation portion 32, it is possible to prevent the foot from being inadvertently caught on the lower surface operation portion 32 when the foot is positioned near the lower surface operation portion 32 side.

Further, in the brake pedal 20 of the present embodiment, the lower surface uneven portion 34 is formed on the side of the arm portion 21 in the vehicle width direction Dw with respect to the inclined portion 37.

According to this configuration, since the inclined portion 37 is provided on the side apart from the arm portion 21 with respect to the lower surface uneven portion 34, when the foot is moved from the brake operation portion 31 side to the lower surface uneven portion 34 side of the lower surface operation portion 32, or when the foot is moved from the lower surface uneven portion 34 side of the lower surface operation portion 32 to the brake operation portion 31 side, it is possible to suppress the inadvertent catching of the foot on the pedal portion 22.

In addition, in the brake pedal 20 of the present embodiment, the range H2 in the vehicle width direction Dw in which the lower surface uneven portion 34 is formed is smaller than the range H1 in the vehicle width direction Dw in which the upper surface uneven portion 33 is formed.

According to this configuration, it is possible to prevent the foot from inadvertently touching the lower surface operation portion 32.

In addition, in the brake pedal 20 of the present embodiment, an unevenness interval H4 in the vehicle width direction Dw of the lower surface uneven portion 34 is smaller than the unevenness interval H3 in the vehicle width direction Dw of the upper surface uneven portion 33.

According to this configuration, even if the formation range of the lower surface uneven portion 34 is made small, since the number of unevenness can be increased, the foot can be reliably caught by the lower surface uneven portion 34. As a result, when intentionally operating the lower surface operation portion 32, it is possible to suppress the slippage of the foot from the lower surface operation portion 32 and to reliably perform the operation.

Further, in the brake pedal 20 of the present embodiment, the unevenness height dimension T2 of the lower surface uneven portion 34 is smaller than the unevenness height dimension T1 of the upper surface uneven portion 33.

According to this configuration, it is possible to prevent the foot from inadvertently touching the lower surface operation portion 32.

Further, in the brake pedal 20 of the present embodiment, the pedal portion 22 integrally includes a front wall portion 23 positioned on the distal end portion 21b side in the front-rear direction Df facing the vehicle front-rear direction of the arm portion 21, a rear wall portion 24 provided on the proximal end portion 21a side at an interval in the front-rear direction Df with respect to the front wall portion 23, a connecting portion 25 for connecting the front wall portion 23 and the rear wall portion 24 on the side spaced apart from the arm portion 21. The upper surface uneven portion 33 and the lower surface uneven portion 34 are formed on the upper end surfaces 23a and 24a and the lower end surfaces 23b and 24b of the front wall portion 23 and the rear wall portion 24.

According to this configuration, since the front wall portion 23 and the rear wall portion 24 are provided at an interval and there is no bottom portion, sand or mud can be prevented from accumulating on the pedal portion 22, a slip prevention effect of the upper surface uneven portion 33 and the lower surface uneven portion 34 can be reliably exhibited, and the operation of the pedal portion 22 can be reliably performed. In addition, when operating the brake operation portion 31 and the lower surface operation portion 32, since the upper surface uneven portion 33 and the lower surface uneven portion 34 are formed on the front wall portion 23 and the rear wall portion 24, respectively, it is possible to exhibit the slip prevention effect in the front-rear direction Df.

Further, in the brake pedal 20 of the present embodiment, the front wall portion 23 is inclined to approach the rear wall portion 24 side as being separated from the arm portion 21.

According to this configuration, it is possible to prevent the obstacle or the foot of the occupant from being caught from the side of the front wall portion 23 during running.

In addition, in the brake pedal 20 of the present embodiment, the upper surface uneven portion 33 and the lower surface uneven portion 34 have slit grooves 35A, 35B, 36A and 36B that are formed on each of the front wall portion 23 and the rear wall portion 24 and extend in the front-rear direction Df.

According to this configuration, it is possible to enhance the slip prevention effect in the vehicle width direction Dw that intersects the front-rear direction Df.

Further, when the slit grooves 35A, 35B, 36A and 36B extend in the front-rear direction Df in a portion inclined toward the rear wall portion 24 as the front wall portion 23 separates from the arm portion 21, the slit grooves 35A and 36A provided on the upper end surface 23a and the lower end surface 23b of the front wall portion 23 are inclined in the direction inclined toward the rear wall portion 24. Thus, the lengths of the slit grooves 35A and 36A in the front-rear direction Df becomes longer. As a result, it is possible to improve the slip prevention effect of the slit grooves 35A and 36A of the front wall portion 23.

In addition, in the brake pedal 20 of the present embodiment, the slit grooves 35A and 36A formed on the front wall portion 23, and the slit grooves 35B and 36B formed on the rear wall portion 24 are formed at positions communicating with each other.

According to this configuration, when forming the slit grooves 35A and 35B in the pedal portion 22 by cutting or the like by causing the slit grooves 35A and 35B to communicate with each other by the front wall portion 23 and the rear wall portion 24, it is possible to process the slit grooves 35A and 36A of the front wall portion 23 and the slit grooves 35B and 36B of the rear wall portion 24 at the same time, and processability can be enhanced.

Further, the motorcycle 1 of the present embodiment is provided with the aforementioned brake pedal 20.

This makes it possible to reliably perform operations other than operating the rear brake 102 on the brake pedal 20, thereby enhancing the operability of the motorcycle 1.

The present invention is not limited to the above-described embodiments described with reference to the drawings, and various modifications are conceivable in the technical scope thereof.

For example, the shape and configuration of the arm portion 21 and the pedal portion 22 of the brake pedal 20 can be appropriately changed.

Further, in the above-described embodiment, the motorcycle 1 is of the off-road type, but its usage is not limited thereto. Further, the position or the installation posture of the brake pedal 20 can be changed depending on the usage and form of the motorcycle 1. For example, the brake pedal may be provided to be inclined in the front-rear direction. Further, the upper surface uneven portion 33 or the lower surface uneven portion 34 may be formed by providing a plurality of protrusions on the upper surface 22f and the lower surface 22g of the pedal portion 22.

Furthermore, in the above-described embodiment, the lower surface operation portion 32 is operated to enhance the stability of the vehicle body or the body of the occupant, but the lower surface operation portion 32 may be operated for other purposes.

In addition, the saddle-ride type vehicle includes all vehicles in which a driver rides across a vehicle body, includes not only motorcycles (including bicycles with prime movers and a scooter type vehicle) but also three-wheeled (including two-front-wheel and one-rear-wheel vehicles in addition to one-front-wheel and two-rear-wheel vehicles) or four-wheeled vehicles, and also includes a vehicle which includes an electric motor in a prime mover.

Further, the configuration in the above embodiment is an example of the present invention, and various modifications are possible within the scope that does not depart from the gist of the invention.

What is claimed is:

1. A brake pedal device comprising:
    an arm portion pivotally supported on a vehicle body to be rotatable; and
    a pedal portion provided at a distal end portion of the arm portion,
    wherein the pedal portion includes
        a first operation portion configured to operate a brake;
        a first uneven portion formed on at least a part of the first operation portion;
        a second operation portion provided at a position different from the first operation portion; and
        a second uneven portion formed on at least a part of the second operation portion,
    the first operation portion is provided on a first surface of the pedal portion, and
    the second operation portion is provided on a second surface facing a direction difference from the first surface of the pedal portion, and
    the first operation portion is provided to face upward and the second operation portion is provided to face downward in a state of being mounted on a vehicle.

2. The brake pedal device according to claim 1, wherein the pedal portion is provided to protrude in a second direction intersecting a first direction facing a vehicle front-rear direction of the arm portion, and
    an inclined portion inclined to gradually approach a first operation portion side as separating from an arm portion side along the second direction is formed on the second operation portion on a side from which the pedal portion protrudes.

3. The brake pedal device according to claim 2, wherein the second uneven portion is formed on the arm portion side in the second direction with respect to the inclined portion.

4. The brake pedal device according to claim 2, wherein a range in the second direction in which the second uneven portion is formed is smaller than a range in the second direction in which the first uneven portion is formed.

5. The brake pedal device according to claim 2, wherein an unevenness interval of the second uneven portion in the second direction is smaller than an unevenness interval of the first uneven portion in the second direction.

6. The brake pedal device according to claim 1, wherein the pedal portion is provided to protrude in a second direction intersecting a first direction facing a vehicle front-rear direction of the arm portion, and
    an inclined portion inclined to gradually approach a first operation portion side as separating from an arm portion side along the second direction is formed on the second operation portion on a side from which the pedal portion protrudes.

7. The brake pedal device according to claim 6, wherein the second uneven portion is formed on the arm portion side in the second direction with respect to the inclined portion.

8. The brake pedal device according to claim 1, wherein the pedal portion integrally has
    a first wall portion located on the distal end portion side in a first direction facing a vehicle front-rear direction of the arm portion;
    a second wall portion provided on a proximal end portion side at an interval in the first direction with respect to the first wall portion; and
    a connecting portion which connects the first wall portion and the second wall portion on a side away from the arm portion,
    wherein the first uneven portion is formed on first end surfaces of the first wall portion, the second wall portion and the connecting portion, and
    the second uneven portion is formed on second end surfaces of the first wall portion and the second wall portion.

9. The brake pedal device according to claim 8, wherein the first wall portion is inclined to approach the second wall portion side as being separated from the arm portion.

10. The brake pedal device according to claim 8, wherein the first uneven portion has first slit grooves and second slit grooves formed on each of the first wall portion and the second wall portion and extending in the first direction, and the second uneven portion has third slit grooves and fourth slit grooves formed on each of the first wall portion and the second wall portion and extending in the first direction.

11. The brake pedal device according to claim 10, wherein the first slit grooves formed in the first wall portion and the second slit grooves formed in the second wall portion are formed at positions communicating with each other,
the third slit grooves formed in the first wall portion and the fourth slit grooves formed in the second wall portion are formed at positions communicating with each other.

12. A motorcycle comprising the brake pedal device according to claim 1.

13. A brake pedal device comprising:
an arm portion pivotally supported on a vehicle body to be rotatable; and
a pedal portion provided at a distal end portion of the arm portion,
wherein the pedal portion includes
a first operation portion configured to operate a brake;
a first uneven portion formed on at least a part of the first operation Portion;
a second operation portion provided at a position different from the first operation portion; and
a second uneven portion formed on at least a part of the second operation portion,
the first operation portion is provided on a first surface of the pedal portion,
the second operation portion is provided on a second surface facing a direction different from the first surface of the pedal portion,
the pedal portion is provided to protrude in a second direction intersecting a first direction facing a vehicle front-rear direction of the arm portion, and
an inclined portion inclined to gradually approach a first operation portion side as separating from an arm portion side along the second direction is formed on the second operation portion on a side from which the pedal portion protrudes.

14. The brake pedal device according to claim 13, wherein the second uneven portion is formed on the arm portion side in the second direction with respect to the inclined portion.

15. A brake pedal device comprising:
an arm portion pivotally supported on a vehicle body to be rotatable; and
a pedal portion provided at a distal end portion of the arm portion,
wherein the pedal portion includes
a first operation portion configured to operate a brake;
a first uneven portion formed on at least a part of the first operation portion;
a second operation portion provided at a position different from the first operation portion; and
a second uneven portion formed on at least a part of the second operation portion,
the first operation portion is provided on a first surface of the pedal portion,
the second operation portion is provided on a second surface facing a direction different from the first surface of the pedal portion, and
an unevenness height dimension of the second uneven portion is smaller than an unevenness height dimension of the first uneven portion.

* * * * *